(12) United States Patent
Hasenjaeger

(10) Patent No.: US 8,960,743 B1
(45) Date of Patent: Feb. 24, 2015

(54) MODULAR TRAIL TOOL

(71) Applicant: William H. Hasenjaeger, Bellingham, WA (US)

(72) Inventor: William H. Hasenjaeger, Bellingham, WA (US)

( * ) Notice: Subject to any disclaimer, the term of this patent is extended or adjusted under 35 U.S.C. 154(b) by 92 days.

(21) Appl. No.: 13/826,221

(22) Filed: Mar. 14, 2013

(51) Int. Cl.
*A01B 1/22* (2006.01)
*B25G 3/12* (2006.01)

(52) U.S. Cl.
CPC .......................................... *A01B 1/22* (2013.01)
USPC ................................ 294/51; 294/57; 403/348

(58) Field of Classification Search
USPC ................. 294/51, 53.5, 57, 59, 60; 403/348; 15/145; 172/375
See application file for complete search history.

(56) References Cited

U.S. PATENT DOCUMENTS

| | | | | |
|---|---|---|---|---|
| 154,018 | A | * | 8/1874 | Cassiano ........................ 294/51 |
| 156,931 | A | * | 11/1874 | Faunt Le Roy ................ 294/51 |
| 208,749 | A | | 10/1878 | McCann |
| 848,922 | A | * | 4/1907 | Pofahl ............................ 294/51 |
| 855,902 | A | * | 6/1907 | Orr ............................. 294/50.7 |
| 986,761 | A | | 3/1911 | Roscoe |
| 1,711,916 | A | * | 5/1929 | Atkinson .................... 294/53.5 |
| 2,322,947 | A | | 5/1942 | Litwin et al. |
| 2,793,902 | A | * | 5/1957 | Govan, Jr. ...................... 294/57 |
| 3,401,971 | A | * | 9/1968 | Cronquist ................... 294/53.5 |
| 4,224,786 | A | | 9/1980 | Langlie et al. |
| 4,406,559 | A | | 9/1983 | Geertsema et al. |
| 4,433,931 | A | | 2/1984 | Malish et al. |
| 4,441,747 | A | | 4/1984 | Bryington, II |
| 4,697,949 | A | | 10/1987 | Perez |
| 5,366,314 | A | | 11/1994 | Young |
| 5,579,848 | A | | 12/1996 | Hsu |
| 5,603,584 | A | | 2/1997 | Schuele |
| 5,690,181 | A | | 11/1997 | Shu |
| 5,816,337 | A | | 10/1998 | Kun-Chuan |
| 5,842,810 | A | | 12/1998 | Morad |
| 5,921,700 | A | | 7/1999 | Haver et al. |
| 6,220,639 | B1 | | 4/2001 | Aquilina |
| 6,254,303 | B1 | | 7/2001 | Falat et al. |
| 6,315,488 | B1 | | 11/2001 | Parker |
| 6,671,930 | B2 | * | 1/2004 | Lanz ............................... 16/429 |
| 6,820,301 | B2 | | 11/2004 | Petner |
| 8,322,764 | B2 | | 12/2012 | Miller et al. |
| 2010/0192738 | A1 | | 8/2010 | Fenstemaker |

OTHER PUBLICATIONS

Trail Insight Trail Boss: The packable trail working tool that You can order around. www.trail-insight.com/instructions/instructions.html, Feb. 13, 2013.

* cited by examiner

*Primary Examiner* — Dean Kramer
(74) *Attorney, Agent, or Firm* — Dwayne E. Rogge; Schacht Law Office, Inc.

(57) ABSTRACT

Disclosed herein are several examples of an adapter for a modular tool system. The adapter in one form comprising: a handle attachment device fixed to a shovel head; the handle attachment device removably attached to a coupler which is fixed to one longitudinal end of an elongate handle; the elongate handle having a longitudinal axis wherein the coupler is in line with the longitudinal axis of the longitudinal axis of the handle; an offset arm having a first end fixed to the handle attachment device, the offset arm extending from the handle attachment device and extending to a second end removably coupled to the elongate handle at a point longitudinally distal of the coupler; and wherein the offset arm extends from the handle attachment device at a vertical offset distance from the longitudinal axis of the elongate handle.

4 Claims, 5 Drawing Sheets

MODULAR TRAIL TOOL

BACKGROUND OF THE DISCLOSURE

Field of the Disclosure

This disclosure relates to the field of lawn and garden, firefighting, trail building and other earth moving hand tools which are modular in that they can be broken down and stored in a smaller footprint than their operating or assembled configuration.

SUMMARY OF THE DISCLOSURE

Disclosed herein are several examples of an adapter for a modular tool system. The adapter in one form comprising: a handle attachment device fixed to a shovel head; the handle attachment device removably attached to a coupler which is fixed to one longitudinal end of an elongate handle; the elongate handle having a longitudinal axis wherein the coupler is in line with the longitudinal axis of the longitudinal axis of the handle; an offset arm having a first end fixed to the handle attachment device, the offset arm extending from the handle attachment device and extending to a second end removably coupled to the elongate handle at a point longitudinally distal of the coupler; and wherein the offset arm extends from the handle attachment device at a vertical offset distance from the longitudinal axis of the elongate handle.

The adapter as recited herein may further comprise a clamp apparatus removably coupled to the elongate handle wherein the clamp forms one portion of the attachment between the elongate handle and the offset arm.

The adapter as recited herein may further comprise: a pin extending from the clamp apparatus; a surface defining a void in the second end of the offset arm of slightly larger cross section than a cross section of the pin; and wherein the pin is received by the surface defining the void so as to counter compression forces from the handle attachment device to the clamp apparatus.

The adapter as recited herein may be arranged wherein the coupler comprises: a plurality of teeth with grooves there between extending longitudinally from the coupler; a plurality of grooves and teeth there between extending longitudinally from the handle attachment device, wherein the teeth protruding from the coupler engage the grooves of the handle attachment device and vice versa; a male threaded surface on either the coupler or the handle attachment device; and a female threaded ring.

BRIEF DESCRIPTION OF THE DRAWINGS

In FIGS. 3, 4, and 5, the handle extension 30 has been cut off to better show the remaining components.

DESCRIPTION OF THE PREFERRED EMBODIMENTS

Figure 1:
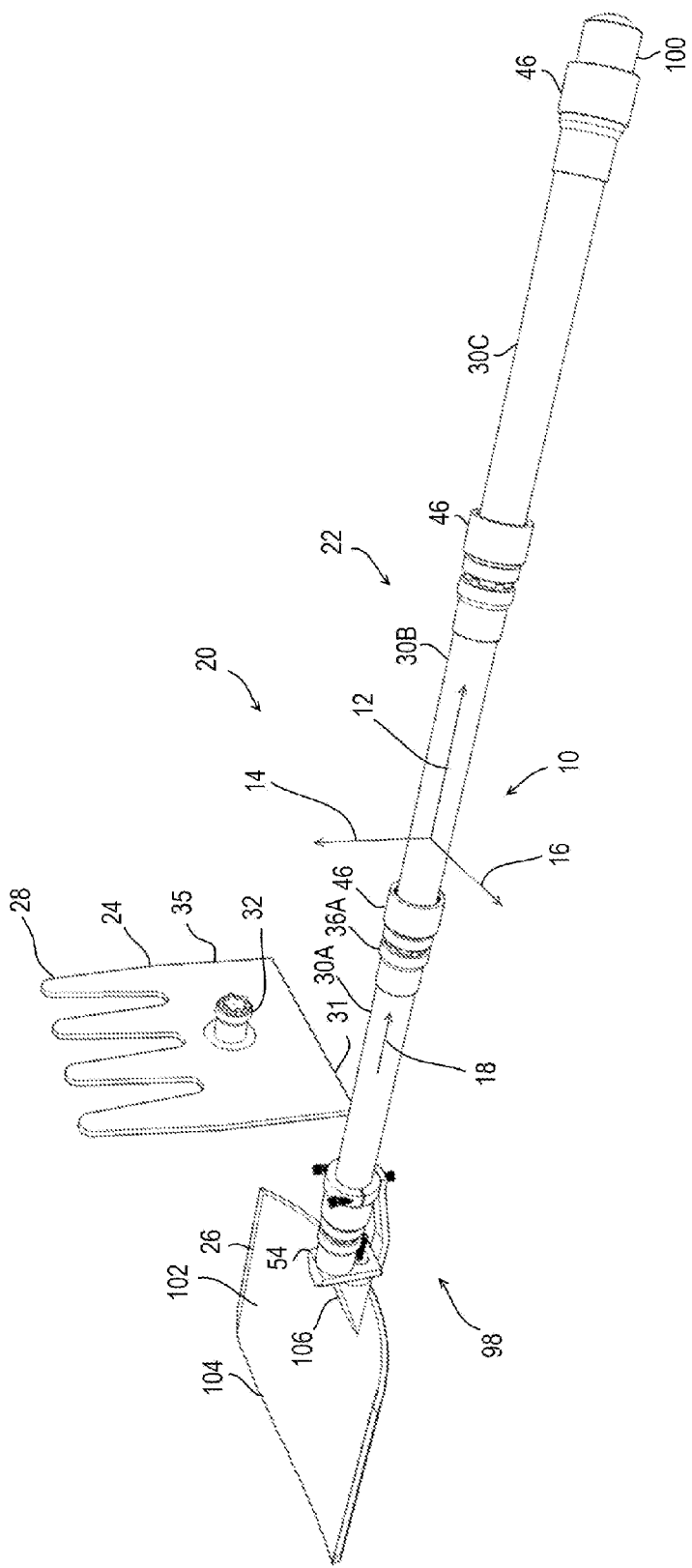
FIG. 1 is an isometric view of one example of the apparatus in an assembled state.

Looking to FIG. 1 is shown a modular tool 20 comprising an elongate handle 22 and a plurality of interchangeable tool heads 24 and 26. The first tool head 24 comprises a McLeod head having a rake portion 28 and a hoe portion 31. The second tool head 26 is a shovel head.

Before continuing a detailed description, an axes system 10 is shown in FIG. 1 generally comprising a longitudinal axis 12, a vertical axis 14 generally orthogonal to the longitudinal axis 12 and orthogonal to a general plane of the shovel head 26. Also disclosed is a transverse axis 16 which is orthogonal to the vertical axis 14 and the longitudinal axis 12. The longitudinal axis 12 is generally collinear to the handle axis 18. The handle axis 18 generally aligned with the radial center of the elongate tool handle 22.

As can be seen in FIG. 1, the elongate handle 22 in one example comprises a plurality of individual handle extensions 30A, 30B, and 30C. As will be understood, additional handle extensions 30 can be utilized for a longer elongate handle 22 or alternatively, fewer handle extensions 30 can be utilized for a shorter elongate handle 22.

In this disclosure, it will be attempted to identify generic components with a numeric label and specific examples of each generic component of an alphabetic suffix. For example, a general handle extension will be termed 30 while the specific handle extensions shown in FIG. 1 are labeled with 30A-30C.

Figure 2:
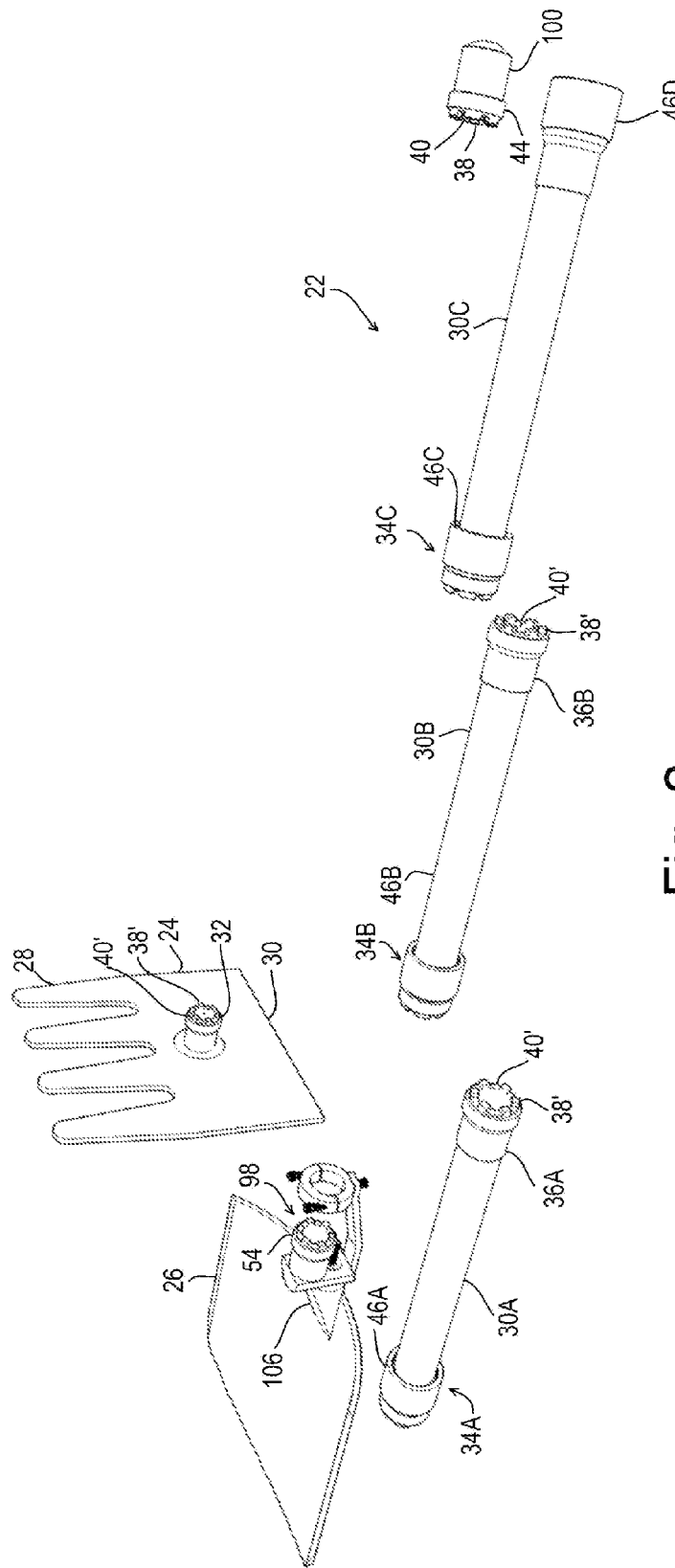
FIG. 2 is an isometric view of the example of FIG. 1 in a disassembled state.

Looking to FIG. 2, it can be understood that the tool head 24 is a McLeod style tool head having a rake portion 28 and a hoe portion 30. In addition, a tool head coupling 32 is fixed to the back side 35 of the tool head 24 protruding therefrom. The tool head coupling 32 removably attached to a first end coupling 34A of the first handle extension 30A, the first end coupling 34A in this example having teeth 38 and grooves 40 therebetween. The teeth 38 fitting within grooves 40' of the tool head coupling 32 and teeth 40' of the tool head coupling 32 fitting within grooves 40 of the first end coupling 34A. As with the alphabetic suffix, an apostrophe (') may be utilized to denote substantially identical components on alternate structures as can be understood by the preceding description.

Figure 4:
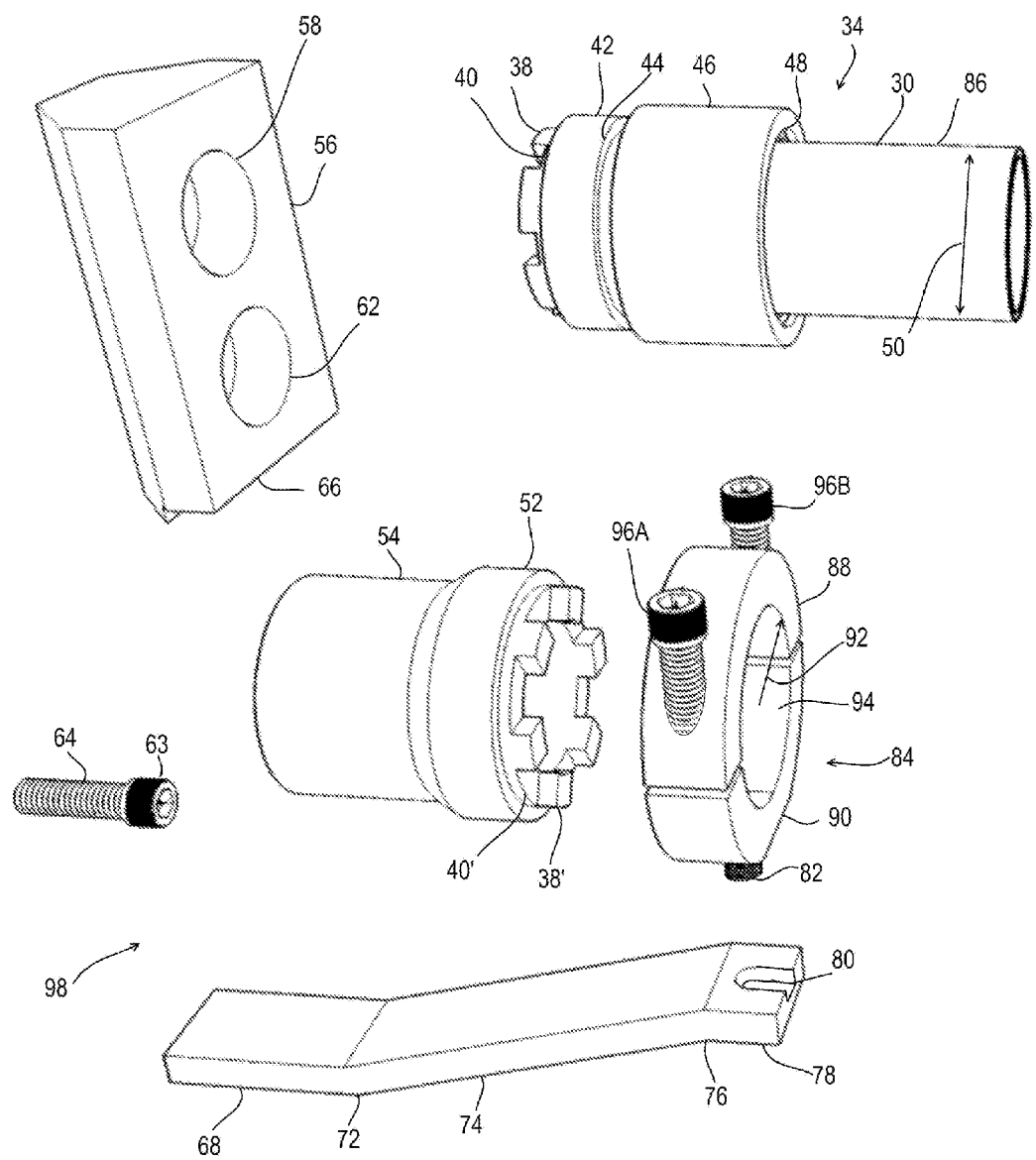
FIG. 4 is a detail exploded view of the example of FIG. 2 with several components removed to show the remaining components in more detail.

While different examples of the handle extensions can be utilized, looking to FIG. 4, it can be appreciated that in this example the handle extension 30 has a first end coupling 34 with teeth 38 and grooves 40 protruding from the longitudinal end thereof. In the example shown, adjacent the teeth 38 and grooves 40 is a smooth surface 42 with a shoulder 44 adjacent thereto and longitudinally proximal to the first handle extension 30. Also shown is a female threaded ring 46 with an inset ring 48 machined or formed on the proximal end thereof. The female threaded ring 46 generally has an inner diameter slightly larger than the outer diameter of the smooth surface 42 so as to slide thereupon. The inset ring 48 has an inner diameter larger than the diameter 50 of the tube portion of the handle extension 30 so as to slide thereupon. The inner diameter of the inset ring 48 as shown is substantially smaller than the outer diameter of the smooth surface 42 so that the inset ring 48 engages the shoulder 44 as the female threaded ring 46 is threaded up on a male threaded portion 52 of a male coupler portion 54. The male coupler portion 54 may be utilized as a portion of the tool head coupling 32, shovel head coupling 98, or second end coupling 36.

FIG. 4 shows the shovel head coupling 98 including the male coupler portion 54 already described as well as a tool head block 56 which is attached to the shovel head 26 and one example. In one form, the tool head block 56 comprises an indent 58 which receives a detent 60 protruding from the longitudinal end of the male coupler portion 54. In one form, upon positioning of the male coupler portion 54 to the tool head block 56, fasteners, adhesives, or welding may be employed to fix the male coupler portion 54 to the tool head block 56.

Figure 5:
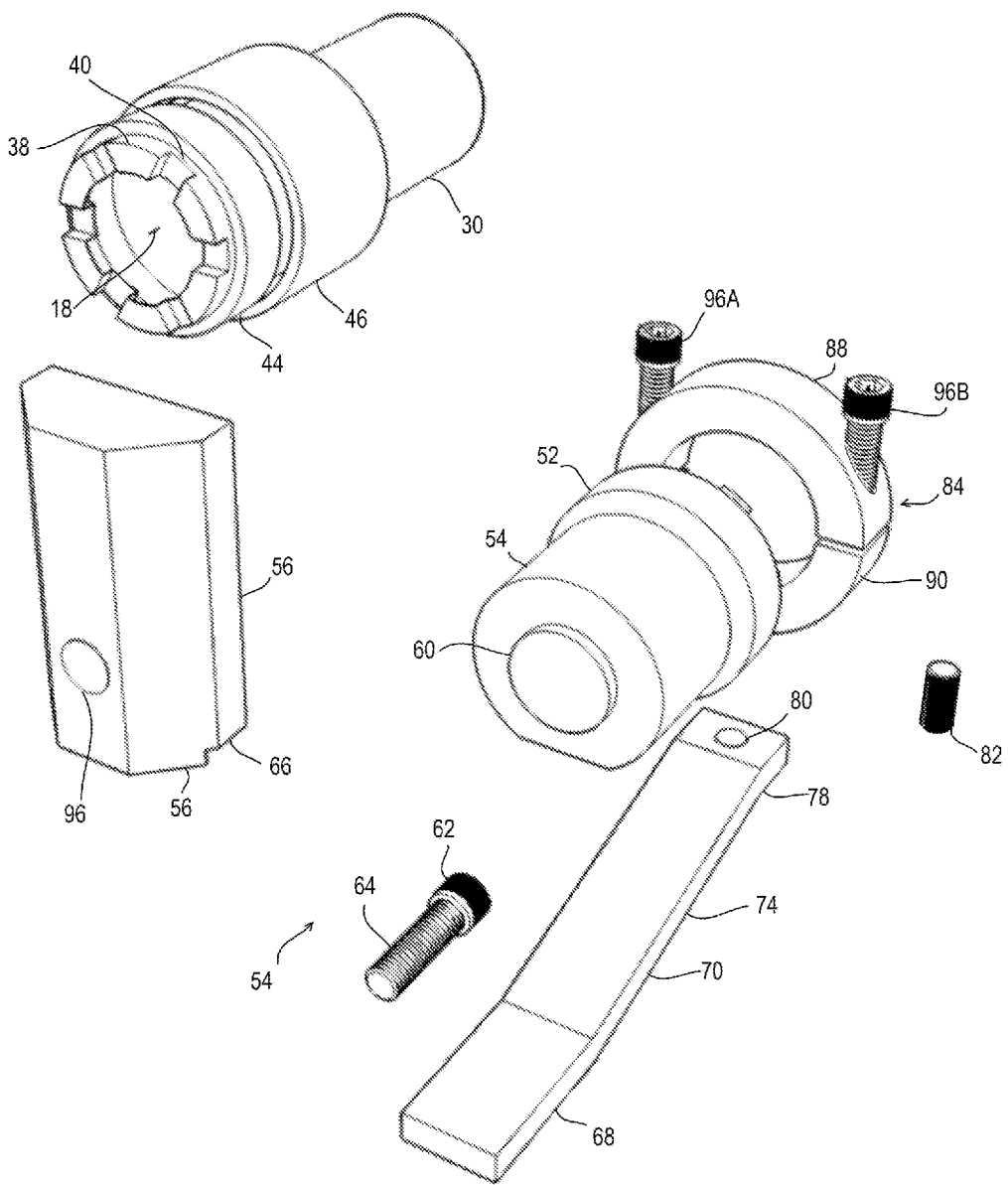
FIG. 5 is a detail exploded view of the example of FIG. 4 from a different angle.

The tool head block 56 in one example also comprises a countersink void 62 for receiving a head portion 63 of a fastener 64 which is threaded into a receiving portion 106 of the shovel head 26. This assembly is more easily seen in FIG. 3. In one form, a threaded void is provided in the receiving portion 106; although adhesives or welding may also be utilized to attach the tool head block 56 to the receiving portion 106. FIG. 5 shows a pass through void 96 through which the fastener 64 passes as it is threaded into the receiving portion 106. The tool head block 56 in one example also comprises an offset arm receiver 66 to which first end 68 of the offset arm 70 is attached by way of adhesives, fasteners, welding, brazing etc.

The first end 68 of the offset arm 70 in this example is generally aligned with the handle axis 18 and parallel thereto. In one form, the offset arm 70 comprises a bend 72 between the first and 68 and a median portion 74 and a bend 76 between the median portion 74 and a second end 78. In one form, the second and 78 is again parallel to the handle axis 18 and may comprise a void 80 for receiving of a pin 82 or fastener which allows removable attachment of the offset arm 70 to the handle extension 30 at a position along the handle extension 30 distal from the first end coupling 34.

FIG. 4 also shows a clamp apparatus 84 for placement of the pin 82 upon the outer surface 86 of the handle extension 30. In other examples, the pin 82 may protrude from the handle extension 30 or may be attached using other means. In this example, the clamp apparatus 84 comprises an upper clamp portion 88 and a lower clamp portion 90 where in the inner diameter 92 of the clamp apparatus 84 is slightly smaller than the diameter 50 of the handle extension 30 such that when clamp fasteners 96A and 96B are tensioned the inner surface 94 of the clamp apparatus 84 compresses about the outer surface 86 of the handle extension 30 and is therefore removably attached thereto. Removal being accomplished by releasing tension between the upper clamp portion 88 and lower clamp portion 90 through counter rotation of the clamp fasteners 96A and 96B.

The pin 82 may be press fit, threaded into, welded to or otherwise affixed to the lower clamp portion 94 may be formed as a unitary structure there with.

Figure 3:
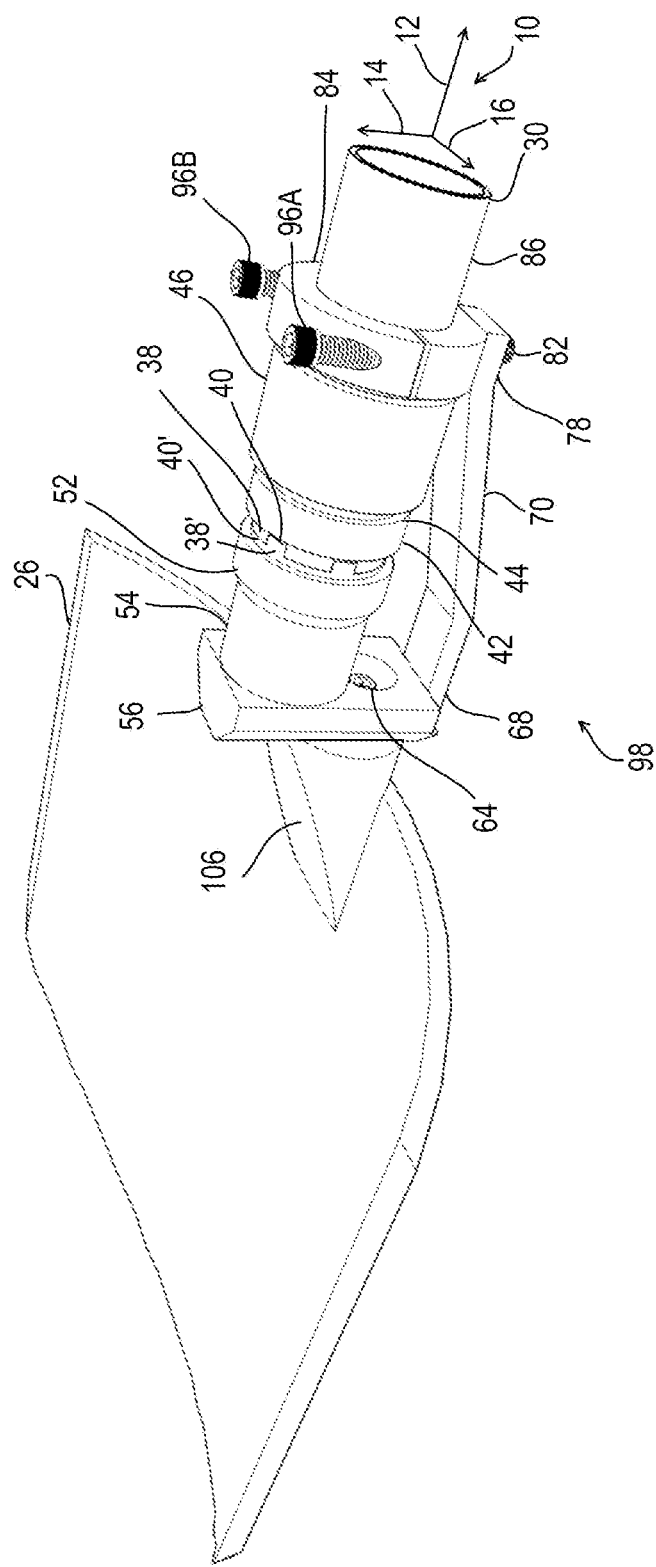
FIG. 3 is a detail exploded view of the example of FIG. 1.

As can be seen in the example of FIG. 3, when the shovel head coupling 98 is assembled, the first and 68 of the offset arm 70 is attached to the tool head block 56, the tool head block 56 is attached to the receiving portion 106 of the shovel head 26, and the male coupler portion 54 is attached to the tool head block 56. Likewise, the clamp apparatus 84 is attached to the outer surface 86 of the handle extension 30.

Once the components described above are connected, the shovel head 26 has a portion of the shovel head coupling 98 attached thereto, while the clamp apparatus 84 is attached to one of the handle extensions 30. With the handle extension 30 detached and the separate handle extensions 30A-30C detached from each other the overall length of the separate components is substantially small compared to a standard long handled shovel and also when compared to the assembled apparatus. This allows for easy storage or transportation such as in a backpack.

To attach the handle extension 32 the shovel head 26 one may begin with the step of aligning the handle extension 30 such that the teeth 38' on the shovel head coupling 98 align with grooves 38 on the first end coupling 34 and likewise grooves 40' align with teeth 40. Once the teeth and grooves are aligned and engaged, the female threaded ring 46 may then be slid longitudinally past the smooth surface 42 and threaded onto the male threaded portion 52 until the inset ring 48 is in compression against the shoulder 44 substantially retaining the handle extension 30 upon the shovel head coupling 98.

A similar process is utilized or followed to attach individual handle extensions 32 adjacent handle extensions. In addition, at the longitudinally distal end of the assembled handle 22, a handle end cap 100 may be provided having teeth 38 and grooves 40 substantially identical to those shown on each handle extension 30 as well as a shoulder 44 and female threaded ring 46D. This end cap 100 and ring 46D in one form protect the distal end of the third handle extension 30C. In one form, the end cap may be formed without teeth and grooves. In one example the threaded ring 46 is formed as a unitary structure with the end cap 100.

Looking back to FIG. 3, it can be seen that as the handle extension 30 has been engaged to the shovel head coupling 98, the pin 82 is received by the void 80 in the offset support arm 70. As the offset support arm 70 is significantly rigid and capable of providing substantial compression resistance can be appreciated that when a leveraging force is placed upon the elongate handle 22 relative to the scoop portion 102 and/or blade portion 104 of the shovel head 26 a bending moment is generally centered upon the shovel head coupling 98 providing significant and potentially detrimental force thereupon. The offset support arm 70 therefore takes a substantial amount of this bending moment and translates the force directly to the shovel head 26 resulting in the shovel head coupling 98 experiencing substantially more tensile strength then bending moment. For example, when the assembled apparatus is used for digging of heavy or hard earth the bending moment provided to the shovel head coupling 98 in such an operation may be enough to break the shovel head coupling 98 were it not for the offset arm 70.

In one example, it may be desired to leave the clamp fasteners 96A and 96B un-tensioned or slightly tensioned prior to initial attachment of the handle extension 32 the shovel head 26. Once initially in position, the clamp fasteners 96 may be tensioned and in this way, upper alignment of the pin 82 relative to the void 80 can be assured. Once tensioned, it is a relatively simple matter to unscrew the female threaded ring 46 of each handle extension 30 and disassemble the apparatus. This process should only be required at initial assembly, as the clamp will remain in the proper position once initially attached and tensioned.

In one form, as shown in FIG. 4, the surface defining a void 80 may form a slot open towards the second end 78 of the offset arm 70. This arrangement will reduce the assembly's ability to counter tension forces, but will not affect the assembly's ability to counter compression forces and will make assembly easier then the non-slotted arrangement.

While it is a common term, the term distal herein meaning situated away from the point of origin or attachment, as of a limb or bone; terminal.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:

1. An adapter for a modular tool system, the adapter comprising:
   a handle attachment device fixed to a shovel head;
   the handle attachment device removably attached to a coupler which is fixed to one longitudinal end of an elongate handle;
   the elongate handle having a longitudinal axis wherein the coupler is in line with the longitudinal axis of the longitudinal axis of the handle;
   an offset arm having a first end fixed to the handle attachment device, the offset arm extending from the handle attachment device and extending to a second end removably coupled to the elongate handle at a point longitudinally distal of the coupler
   a male threaded surface on either the coupler or the handle attachment device;
   a female threaded ring engaging the male threaded surface; and
   wherein the offset arm extends from the handle attachment device at a vertical offset distance from the longitudinal axis of the elongate handle.

2. The adapter as recited in claim 1 further comprising a clamp apparatus removably coupled to an exterior surface of the elongate handle wherein the clamp apparatus forms one portion of the attachment between the elongate handle and the offset arm.

3. An adapter for a modular tool system, the adapter comprising:
   a handle attachment device fixed to a shovel head;
   the handle attachment device removably attached to a coupler which is fixed to one longitudinal end of an elongate handle;
   the elongate handle having a longitudinal axis wherein the coupler is in line with the longitudinal axis of the longitudinal axis of the handle;
   an offset arm having a first end fixed to the handle attachment device, the offset arm extending from the handle attachment device and extending to a second end removably coupled to the elongate handle at a point longitudinally distal of the coupler;
   wherein the offset arm extends from the handle attachment device at a vertical offset distance from the longitudinal axis of the elongate handle;
   further comprising a clamp apparatus removably coupled to the elongate handle wherein the clamp apparatus forms one portion of the attachment between the elongate handle and the offset arm
   a pin extending from the clamp apparatus;
   a surface defining a void in the second end of the offset arm of slightly larger cross section than a cross section of the pin; and
   wherein the pin is received by the surface defining the void so as to counter compression forces from the handle attachment device to the clamp apparatus.

4. An adapter for a modular tool system, the adapter comprising:
   a handle attachment device fixed to a shovel head;
   the handle attachment device removably attached to a coupler which is fixed to one longitudinal end of an elongate handle;
   the elongate handle having a longitudinal axis wherein the coupler is in line with the longitudinal axis of the longitudinal axis of the handle;
   an offset arm having a first end fixed to the handle attachment device, the offset arm extending from the handle attachment device and extending to a second end removably coupled to the elongate handle at a point longitudinally distal of the coupler;
   wherein the offset arm extends from the handle attachment device at a vertical offset distance from the longitudinal axis of the elongate handle;
   the coupler comprising
      a plurality of teeth with grooves therebetween extending longitudinally from the coupler;
      a plurality of grooves and teeth therebetween extending longitudinally from the handle attachment device, wherein the teeth protruding from the coupler engage the grooves of the handle attachment device and vice versa;
      a male threaded surface on either the coupler or the handle attachment device; and
      a female threaded ring.

* * * * *